United States Patent [19]

Imasaki

[11] Patent Number: 5,537,274
[45] Date of Patent: Jul. 16, 1996

[54] MAGNETIC HEAD SUPPORT GIMBAL HAVING ARCUATE SIDE RAILS

[75] Inventor: Katsuhiro Imasaki, Kyoto, Japan

[73] Assignee: Suncall Corporation, Kyoto-fu, Japan

[21] Appl. No.: 340,400

[22] Filed: Nov. 15, 1994

[51] Int. Cl.$^6$ ............................................. G11B 5/596
[52] U.S. Cl. .................................... 360/104; 360/105
[58] Field of Search .................................. 360/104, 103, 360/105

[56] References Cited

U.S. PATENT DOCUMENTS 5,187,625  2/1993  Blaeser et al. ........................... 360/104

*Primary Examiner*—John H. Wolff
*Attorney, Agent, or Firm*—Pollock, Vande Sande & Priddy

[57] ABSTRACT

The invention is aimed at miniaturization and thinning of a magnetic head support device of a floating type. The magnetic head support device includes a load beam 3 having upstanding side rails 22 extending along the longitudinal side edges of the load beam. The magnetic support device also includes a gimbal 2 having upstanding side rails 21 extending along the longitudinal edges of the gimbal for a predetermined distance. The gimbal 2 is disposed below the load beam 3. The upper edges of the side rails 21 of the gimbal are engaged with the lower surface of the load beam 3, so that a predetermined spacing is maintained as between the lower surface of the load beam and the upper surface of the gimbal 2.

2 Claims, 3 Drawing Sheets

MAGNETIC HEAD SUPPORT GIMBAL HAVING ARCUATE SIDE RAILS

FIELD OF THE INVENTION

This invention relates to a magnetic head support device of a floating type. More particularly, the invention relates to a provision of means for miniaturizing and thinning a gimbal to be used in a magnetic head support device of a floating type as an attachment member for a slider.

BACKGROUND OF THE INVENTION

A magnetic head support device of an information processing unit for supporting a magnetic head over a magnetic disk so as to perform recording and reproducing of information comprises, as shown in FIG. 3, a slider 1 having a magnetic head thereon, a gimbal 2 for supporting the slider 1 for rolling motion, and a load beam 3 supporting the gimbal 2. More particularly, the gimbal 2 is attached to the forward end of the load beam 3 for rolling motion by means of fastening means such as welds 5. The gimbal 2 is formed from a thin, electrically conductive plate, such as a thin plate of phosphor bronze. A semi-spherical protrusion 4 is formed on the upper surface of the gimbal 2. The protrusion 4 is a constructional member of the magnetic head for permitting the slider 1 having the magnetic head thereon to be rolled in accordance with the irregularities on the surface of the magnetic disk so as to perform recording and reproducing magnetic information.

With the conventional magnetic head support device of a floating type 10 as shown in FIGS. 3A and 3B, a semi-spherical protrusion 4 is welded to the upper surface of a tongue portion 2A for attachment of the slider thereon. The tongue portion 2A extends from the distal end toward the proximal end of the gimbal 2 in a cantilever fashion. Thus, when the main body of the gimbal 2 has a thickness of 30 micrometers and the protrusion 4 has a height of 140 micrometers, the total thickness of the gimbal 2 and the protrusion 4 at the tongue portion 2A will be 170 micrometers. Generally, the gimbal 2 is set at a thickness of 25 to 50 micrometers. Thus, when the thickness of the gimbal 2 is selected to be 50 micrometers, the total thickness of the gimbal 2 and the protrusion 4 at the tongue portion 2A will reach up to 190 micrometers. Thus, in conventional technique, the magnetic head support device 10 as a suspension unit will have a increased thickness corresponding to the height of the protrusion 4 even when the thickness of the gimbal 2 is reduced. This impairs miniaturizing and thinning of the magnetic head support device.

SUMMARY OF THE INVENTION

This invention is aimed at reduction of the thickness of the suspension unit by obviating the protrusion 4 which has been considered indispensable to the conventional magnetic head support device 10 of a floating type, so as to obtain an improved magnetic head support device of a floating type in terms of miniaturization and thinning effects.

In order to achieve the above object, the invention provides a magnetic head support device comprising a gimbal connected to the distal end of a load beam. The gimbal is formed from a thin metal plate. The gimbal includes a distal end portion formed in an attachment portion for a slider having a magnetic head thereon. The gimbal is disposed below the load beam. The load beam includes upstanding side rails extending along the longitudinal side edges of the load beam. The gimbal includes upstanding side rails extending along the longitudinal side edges of the gimbal for a predetermined distance. The upper edges of the side rails of the gimbal are engaged with the lower surface of the load beam, so that a predetermined spacing is maintained between the lower surface of the load beam and the upper surface of the gimbal.

The upper edges of the side rails extending along the longitudinal side edges of the gimbal may be formed into an arcuate configuration. The arcuate upper edges serve as means for increasing rolling ability of the slider.

Stepped portions may be formed in the gimbal body at positions proximal of the side rails of the gimbal. The stepped portions extend across the gimbal body. The stepped portions serve as gap prevention means for preventing the distal end portion of the gimbal from being spaced apart from the lower surface of the load beam.

The load beam includes upstanding side rails extending along the longitudinal side edges of the load beam. The gimbal also includes upstanding side rails extending the longitudinal side edges of the gimbal for a predetermined distance. The gimbal is disposed below the load beam. The upper edges of the side rails of the gimbal are engaged with the lower surface of the load beam. By this, a predetermined spacing is maintained between the lower surface of the load beam and the upper surface of the gimbal. The spacing permits the slider to be supported for rolling motion.

BRIEF DESCRIPTION OF THE DRAWINGS

FIG. 1A' is a perspective view of a gimbal body according to a second embodiment of the invention;

DETAILED DESCRIPTION OF THE PREFERRED EMBODIMENTS

Figure 1A:
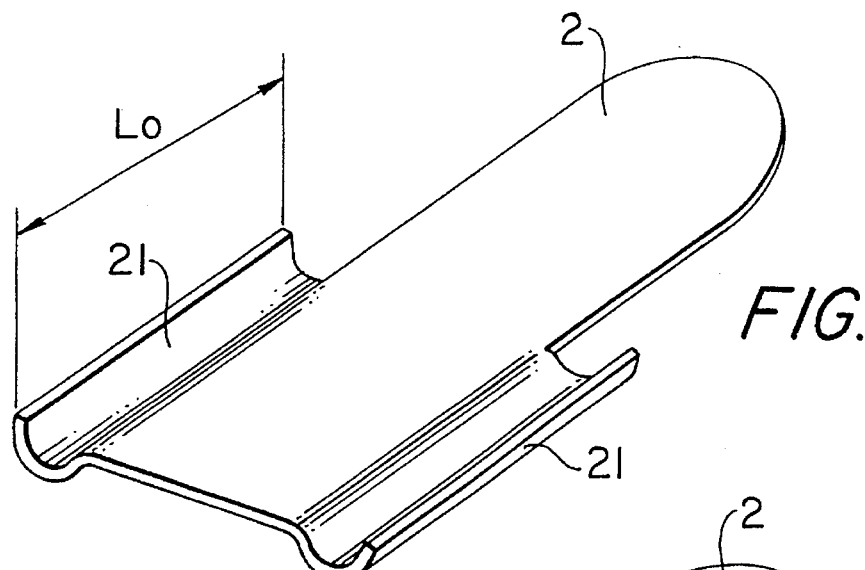
FIG. 1A is a perspective view of a gimbal body according to the invention.
Figure 1A:
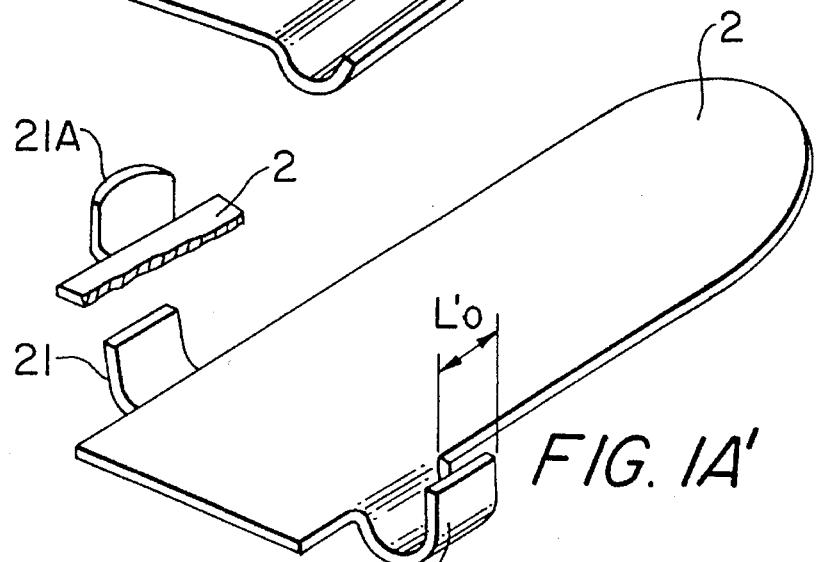

One embodiment of the invention will be explained in detail below with reference to FIGS. 1A, 1A', 1B and 2A–2D. It is noted that the components in these figures that are conventional are basically designated by the same reference numerals as in FIGS. 3A, 3B in order to eliminate repetitive explanation.

Figure 1B:
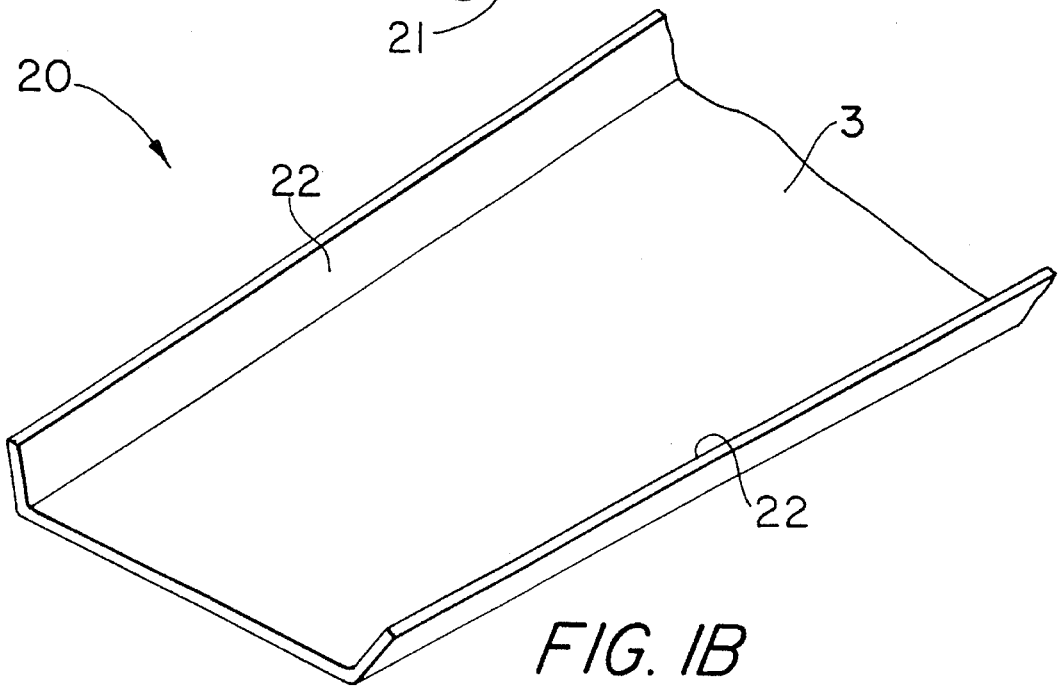
FIG. 1 (B) is a perspective view of a load beam.
Figure 2A:
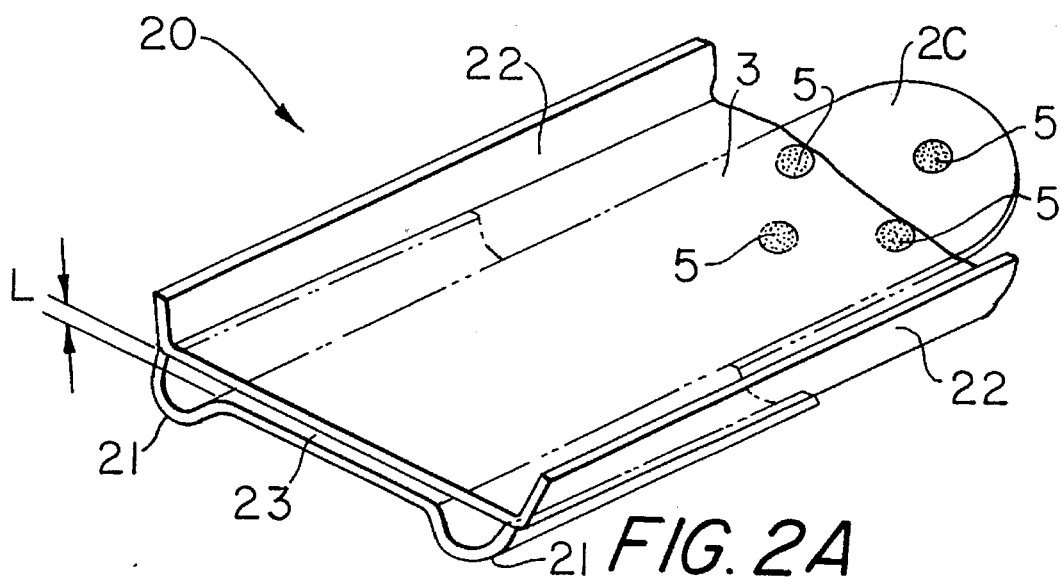
FIG. 2A is a perspective view illustrating weld construction of a magnetic head support device of a floating type.
Figure 2B:
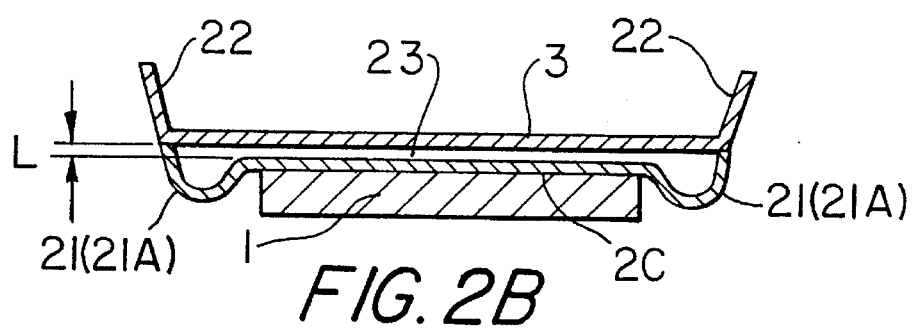
FIG. 2B is a cross-sectional view showing the gimbal body and the load beam.
Figure 2C:
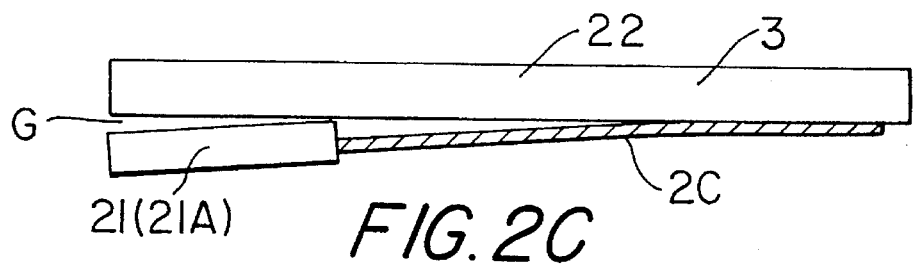
FIG. 2C is a front view illustrating the gimbal body spaced from the load beam.
Figure 2D:
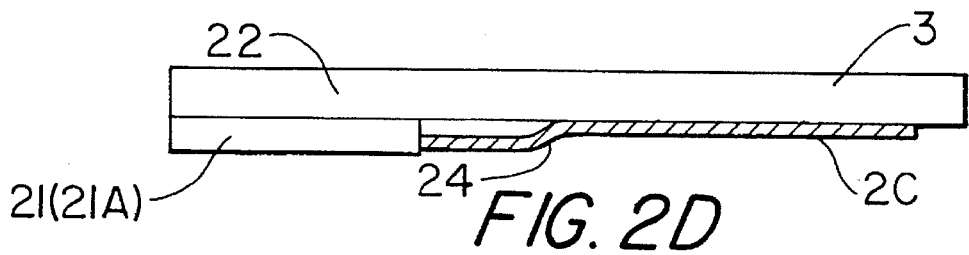
FIG. 2D is a front view illustrating the gimbal body having stepped portion and load beam.

A magnetic head support device 20 of a floating type according to the invention includes a load beam 3 having a pair of upstanding side rails 22 extending along the opposite left-hand and right-hand longitudinal side edges of the load beam 3, as shown in FIG. 1B. FIGS. 2B–2D show a gimbal body 2 is disposed below the load beam 3. The gimbal body 2 includes a pair of upstanding side rails 21 extending along the opposite left-hand and right-hand longitudinal side edges of the gimbal body 2 for a predetermined distance L0 or L'0 as shown in FIGS. 1A and 1A'. As shown in FIGS. 2A and 2B, the side rails 21 of the gimbal body 2 are engaged at their upper edges with the lower surface of the load beam 3, so that a predetermined spacing L is maintained as between the lower surface of the load beam 3 and the upper surface of the gimbal body 2. The spacing L permits rolling motion of the slider 1 attached to the lower surface of the distal end portion of the gimbal body 2. Thus, tracking ability or following ability of a magnetic head relative to the irregularities on a surface of a magnetic disk (not shown) may be maintained at a high level, notwithstanding the fact that a protrusion 4 employed in prior art device is not formed in the upper surface of a tongue portion 2A to which the slider is mounted.

The upper edges of the side rails 21 having the distance L0 or L'0 along the longitudinal side edges of the gimbal body 2 is in general formed into a linear configuration. It is noted, however, that the upper end of the side rail 21A may be formed into an arcuate configuration as shown in FIG. 1A' in order to facilitate rolling motion of the slider 1. By this, contact area between the lower surface of the load beam 3 and the upper surface of the gimbal body 2 is increased so that rolling ability of the magnetic head is increased.

When the gimbal body 2 is formed into a linear configuration as viewed along the longitudinal cross-section, as shown in FIG. 2C, and when the proximal end portion of the gimbal body 2 is welded to the proximal end portion of the load beam 3, it is possible for the distal end portion of the side rail 21 or 21A of the gimbal being spaced from the lower surface of the load beam, so that a gap G is formed therebetween (FIG. 2C). Such a gap may give adverse effect to rolling ability of the magnetic head. Thus, it is desirable to employ means for preventing occurance of such a gap. FIG. 2D illustrates one example of such gap prevention means. The gap prevention means includes stepped portions 24 formed in the gimbal body 2 at a respective position proximal of the side rail 21 or 21A of the gimbal body. The stepped portions extend in the direction of width of the gimbal body 2. The stepped portions have a height less than the thickness of the gimbal body 2 plus the height of the side rail 21 or 21A. The stepped portions 24 may serve as gap prevention means to prevent the distal end portion of the gimbal body 2 from being spaced from the lower surface of the load beam 3.

Figure 3A:
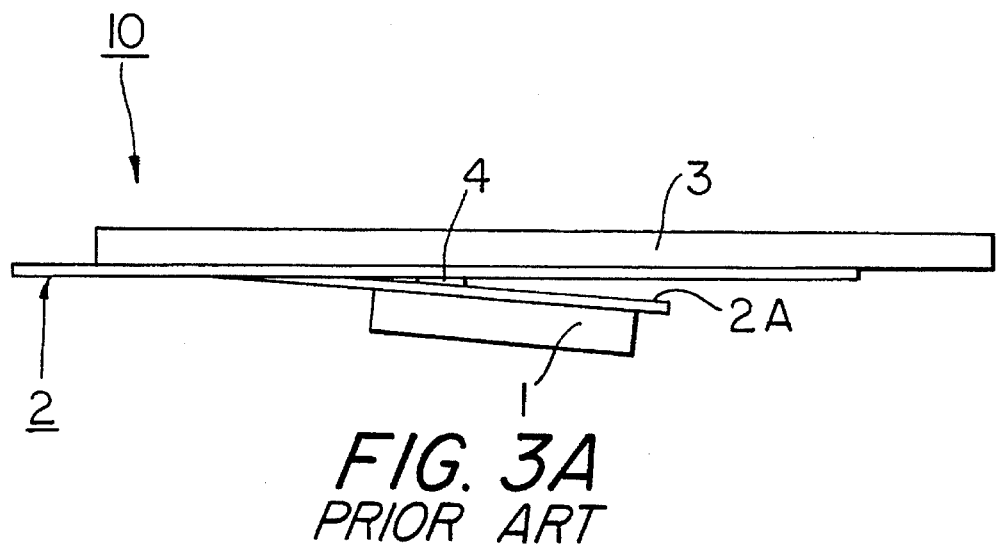
FIG. 3A is a front view showing conventional magnetic head support device.
Figure 3B:
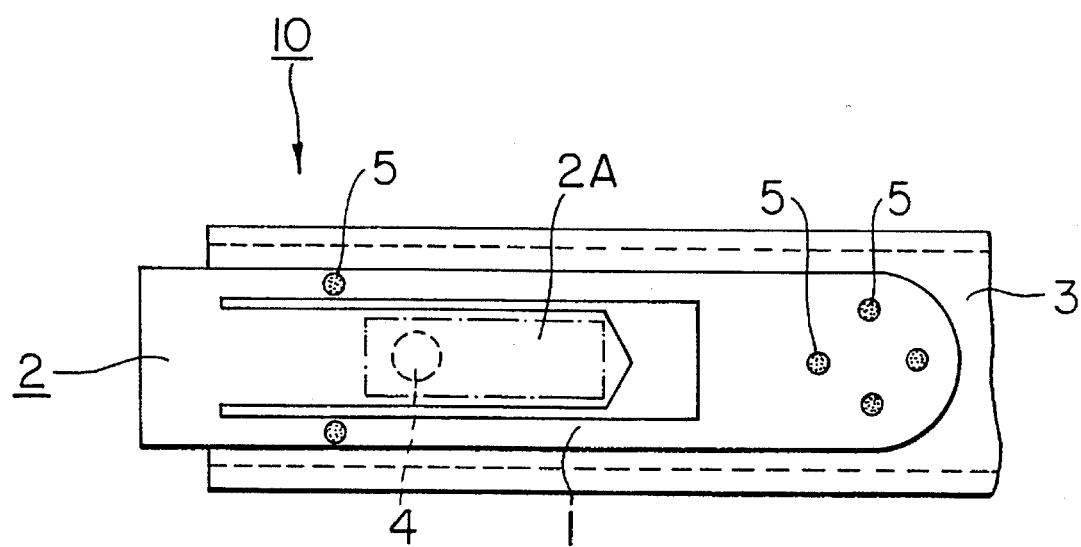
FIG. 3B is a plan view showing the conventional magnetic head support device.

According to the invention, and since it is unnecessary for the protrusion of a semi-spherical configuration to be formed in the upper surface of the gimbal, the total thickness of the suspension unit may be reduced by the height of the protrusion less the above gap L, when a gimbal having a thickness the same as that in the conventional technique as shown in FIGS. 3A, 3B is employed. When the gap L is set to be 50 micrometers, the thickness of the slider attachment portion of a single suspension unit is reduced by the amount of 140 micrometers minus 50 micrometers, i.e., 90 micrometers by reason of absence of the protrusion having a height of 140 micrometers. It is common for a magnetic head support device of a floating type to employ a plurality of suspension units in a stacked manner in order to obtain an increased recording and reproducing capacity. Thus, in a magnetic head support device of a floating type employing eight-stage suspension units, its height may be reduced by the amount of 720 micrometers compares with the conventional technique, so that miniaturization and thinning of the device are achieved, without affecting rolling capability and support rigidity of the slider.

Thus, the invention contributes to thinning of a suspension unit for use in a magnetic head support device of a floating type applicable to high density magnetic disks having a diameter of 2.5 inches or less, so as to permit miniaturization and thinning of a hard disk device.

I claim:

1. A magnetic head support device comprising:
   a load beam having a central planar portion defined by first and second surfaces;
   a gimbal having a central planar portion positioned in underlying, aligned relation with the load beam, the gimbal being cantilever mounted to the load beam at corresponding first ends;
   a pair of upstanding foreshortened parallel side rails integrally extending from lateral edge portions of the gimbal; each of the side rails having a C-shaped transverse cross section and an arcuate outer edge generally longitudinal with the length of the gimbal;
   the arcuate edge of the gimbal normally contacting the first surface of the load beam to facilitate rolling of the gimbal over the arcuate edge, in response to flexure of the gimbal, thereby enhancing the flexibility of the gimbal;
   the first surface of the load beam normally resting at a spaced distance with respect to a confronting first surface of the gimbal; and
   the second surface of the load beam mounting a slider bearing a magnetic head thereon.

2. A magnetic head support device as set forth in claim 1 wherein the gimbal has a stepped offset formed along an intermediate transverse line therealong to maintain aligned second ends of the gimbal and the load beam in contact with each other.

* * * * *